United States Patent [19]

Cunningham

[11] 3,852,451
[45] Dec. 3, 1974

[54] PIG GROWTH FEED COMPOSITION CONTAINING METHYL XANTHINES AND SALTS OF METHYL XANTHINES AND METHOD OF USE

[76] Inventor: Hugh M. Cunningham, 1054 Castle Hill Cres., Ottawa, Canada

[22] Filed: Dec. 3, 1971

[21] Appl. No.: 204,677

Related U.S. Application Data

[63] Continuation-in-part of Ser. No. 728,881, May 14, 1968, abandoned.

[52] U.S. Cl. .............................................. 424/253
[51] Int. Cl. ........................................... A61k 27/00
[58] Field of Search .................................... 424/253

[56] References Cited
OTHER PUBLICATIONS

Milks–Practical Veterinary Pharmacol. Mat. Med. & Therapeutics, 6th Edition, (1949), pages 135–138.

*Primary Examiner*—Sam Rosen
*Attorney, Agent, or Firm*—Pollock, Philpitt & Vande Sande

[57] ABSTRACT

A pig feed composition and method of feeding pigs to increase their feed efficiency, their protein to fat ratio and to regulate their growth rate which includes orally administrating to the pig a compound selected from the group consisting of methyl xanthines and ingestable salts of methyl xanthines in an amount equivalent to between about 0.25 and 2.5 grams of 1, 3, 7-trimethyl xanthine per kilogram of feed.

20 Claims, No Drawings

PIG GROWTH FEED COMPOSITION CONTAINING METHYL XANTHINES AND SALTS OF METHYL XANTHINES AND METHOD OF USE

CROSS-REFERENCES TO RELATED APPLICATIONS

The present application is a continuation-in-part of application Ser. No. 728,881, filed by the present inventor on May 14, 1968 and now abandoned.

BACKGROUND OF THE INVENTION

The present invention relates to a pig feed composition containing methyl xanthines or ingestable salts of methyl xanthines and a method of administering the same. For obvious reasons, many attempts have been made in the past to increase the in-carcass protein to fat ratio, the growth rate and the feed efficiency of pigs. Obviously, a leaner pig carcass produced in this manner will be a more marketable product. Generally speaking, much of the energy of the food consumed by pigs is deposited in fat and, as a result, the feed efficiency of such pigs will be much lower than it would be if they were storing less fat and were using their food energy mainly for maintenance and for growing lean tissue.

One approach to attaining these desirable results has been to restrict the feed intake of pigs since it has been found that, if pigs are given less feed (usually about 10 to 20% less) than they would normally consume if feed were made available at all times, such pigs will grow more slowly and have more time for the true growth of lean tissue and, as a result, have less surplus energy to deposit as fat. This technique is presently in common use by commercial hog producers.

There are certain disadvantages to this procedure of restricting the feed intake of pigs. These disadvantages include the fact that the pigs must be hand fed or fed by the use of expensive automatic equipment. Obviously, the labor involved in manually feeding pigs or the cost of automatic pig feeding equipment adds considerably to the overall cost of raising pigs relative to raising pigs on a demand basis from self-feeding equipment, where very little investment in equipment and very little labor is required.

Another known technique is the selective breeding of very lean pigs. Such breeding has been employed for many years in most parts of the world and is considered to be one of the most effective methods available at the present time.

The obvious disadvantage of this technique is that the breeding of leaner pigs takes many years and, while this procedure is quite effective, it would be desirable if it were more effective or, if in some way, such a breed of pigs could be made even more lean during their raising.

Yet another known technique is the addition of a supplement to the pigs' feed in the form of nicotine. This procedure is taught in U.S. Pat. No. 3,252,802, issued May 24, 1966 and is currently being used commercially. While effective, this procedure generally yields pigs which are only about 5% leaner. In addition, high levels of nicotine sulphate tend to stimulate the appetite of pigs, and this, of course, causes the pigs to consume more feed if it is available to them, thus tending to defeat the purpose of the supplement.

From the above, it is obvious that, at the present time, there is no completely adequate solution to the problem of raising pigs of the required or preferred leanness.

It is therefore an object of the present invention to overcome the problem set forth above. Another object of the present invention is to provide a pig feed composition and method of feeding pigs which provides an improved solution to the problem stated above. Still another object of the present invention is to provide a pig feed composition and method of feeding pigs which will increase the ratio of protein to fat deposited in the carcasses of growing pigs, regulate the growth rate of pigs and increase the feed efficiency of growing pigs. A further object of the present invention is to provide a pig feed composition and method of feeding pigs which will not only make pigs leaner, while they continue to consume less feed, but will also control feed consumption without utilizing manual feeding or automatic feeding equipment.

SUMMARY OF THE INVENTION

In accordance with the present invention, a pig feed composition and a method of feeding pigs is provided wherein the feed of the pig is supplemented by administering to the pig a compound selected from a group consisting of methyl xanthines and ingestable salts of methyl xanthines in amounts equivalent to about 0.25 to 2.5 grams of 1, 3, 7-trimethyl xanthine per kilogram of feed consumed by the pig.

DETAILED DESCRIPTION OF THE PREFERRED EMBODIMENTS

The feed supplement of the present invention includes methyl xanthines, such as, 1, 3, 7-trimethyl xanthine (caffeine); 1, 3-dimethyl xanthine (theophylline); 3, 7-dimethyl xanthine (theobromine), etc. and ingestable salts of methyl xanthines, such as, 1, 3, 7-trimethyl xanthine acetate, 1, 3, 7-trimethyl xanthine benzoate, 1, 3, 7-trimethyl xanthine citrate, 1, 3, 7-trimethyl xanthine salicylate, 1, 3, 7-trimethyl xanthine sodium benzoate, equivalent salts of the other methyl xanthines. A particularly desirable group of methyl xanthines and salts of methyl xanthines, because of their availability and effectiveness, are methyl xanthines and salts of methyl xanthines having 2 to 3 methyl groups per molecule. The methyl xanthines and salts of methyl xanthines have been found to have essentially the same chemical structures and pharmacological properties, as reported by J. M. Ritchie, "Xanthines;" pp. 358 to 370 "The Pharmalogical Basis of Therapeutics," edited by L. S. Goodman and A. Gilman, fourth edition, 1970, The MacMillan Company, Toronto, Canada. This is particularly true, as evidenced by the examples hereinafter presented and by the known fact that all methyl xanthines are excreted as the same derivative (methyl uric acid). The methyl xanthines and the salts of methyl xanthines may be utilized in a number of forms. For example, by-product cocoa bean hulls contain a high concentration of 3, 7-dimethyl xanthine and therefore, provide an economical source of this particular compound. By-products of tea manufacture (1, 3-dimethyl xanthine), by-products of the manufacture of decaffeinized coffee (1, 3, 7-trimethyl xanthine), etc. are also useful. Other similar by-products can also be used to the extent that the specified amounts equivalent to 1, 3, 7-trimethyl xanthine are employed.

The pig feed supplement of the present invention is utilized by orally administering, determined and controlled dosages of the xanthines in various forms. Normally, the supplement will be administered when mixed with a feed. It could also be provided by introducing the same in the animal's drinking water, thereby obtaining the benefits which flow from providing the supplement at different times than the intake of food. This is especially desirable when pigs are fed once daily in that the supplement will be more effective in mobilizing body fat than when given with the feed. While it is possible to inject the supplement into the pigs, this is not really a practical technique.

The amount of the feed supplement which is most effective will, of course, vary with the age of the pigs and other factors. However, it has been found that methyl xanthines and salts of methyl xanthines in amounts equivalent to about 0.25 to 2.5 grams of 1, 3, 7-trimethyl xanthine are effective in increasing the protein to fat ratio in carcasses of pigs fed with such a supplemented feed and are also effective in causing such pigs to grow faster and more efficiently. Since the supplement can be utilized to regulate the growth rate of pigs, the xanthine material in the feed tending to restrict feed consumption without the use of manual feeding or automatic feeding equipment, the preferred amount of feed supplement to be employed is equivalent to about 0.5 to 1.5 grams of 1, 3, 7-trimethyl xanthine per kilogram of feed.

The above ranges of pig supplement to be added to the pig feed have been established by considerable experimentation. In this experimentation, it was determined that amounts of xanthines equivalent to 3.0 grams of 1, 3, 7-trimethyl xanthine per kilogram of feed was too high since it was so effective in mobilizing body fat and in inhibiting appetite that the growth rate of the pigs was unduly restricted. On the other hand, it was discovered that young pigs appear to be more sensitive to the feed supplement and, as a result, at least initially, in feeding young pigs, amounts of xanthines equivalent to 0.5 grams of 1, 3, 7-trimethyl xanthine per kilogram of feed or less can best be used. The preferred average level is about 1.0 gram per kilogram of feed.

It has also been experimentally determined, using a radioactive isotope of carbon (palmitate-$C^{14}$) and known procedures, that the feed supplement of the present invention is effective in mobilizing body fat in pigs and oxidizing it for energy, this effect being significant to at least the extent that extra energy is made available for protein synthesis as well as for other energy requirements. The latter effect can best be put to use in promoting protein synthesis in pigs if the pigs' feed intake is also restricted.

The following examples illustrate the advantages of utilizing the feed supplements of the present invention and also illustrate the preferred embodiments of the present invention.

EXAMPLE 1

Eight Yorkshire barrows weighing about 65 kg. each were placed in tared-metal digestion cages and fed 2000 grams of a 16% protein diet and 2500 grams of water in two daily feedings. Composition of the diet was in %; ground barley 88.15; soybean meal 4.50; fishmeal (65% protein) 5.50; iodized salt 0.50; antibiotic (22 gm. of chlortetracycline per kg.) 0.05; dicalcium phosphate 0.25; ground limestone 0.80; zinc sulphate 0.05; vitamin supplement (containing 1500 I.U. of vitamin A and 300 I.U. of vitamin $D_3$ per kg.) 0.15; vitamin $B_{12}$ supplement (19.8 mg./kg.) 0.05. The pigs were weighed weekly and after one week were allotted into two groups of equal weight. One group (controls) continued to receive the basal diet while caffeine was mixed in the diet of the other group at a level of 1.5 grams per kg. of feed. Dry matter digestibility, protein digestibility and nitrogen retention were determined with each pig over four consecutive seven-day periods according to techniques previously described in an article appearing in the Journal of Animal Science, Volume 22, pages 632 to 636, August 1963 and entitled "Effect of Epinephrine on Nitrogen and Fat Deposition of Pigs" by H. M. Cunningham et al. The results are illustrated in the following table.

TABLE I

Averages and Standard Errors of Weight Gain, Nitrogen Retention and Digestibility Coefficients of Pigs Fed Caffeine in Experiment 1

| Item | Controls | S.E. | Caffeine | S.E. | % Difference |
|---|---|---|---|---|---|
| Number of pigs | 4 | | 4 | | |
| Initial weight, k.g. | 64.5 | 0.59 | 65.2 | 1.18 | |
| Feed per day, gm. | 2000 | | 2000 | | |
| Drinking water per day, gm. | 5000 | | 5000 | | |
| Daily gain, 20 days, gm. | 596 | 9 | 646 | 27 | 8.4 |
| Dry matter digestibility, % | 81.8 | 0.15 | 81.6 | 0.40 | −0.2 |
| Protein digestibility, % | 85.6 | 0.26 | 84.9 | 0.52 | −0.8 |
| Urine per day, kg. | 3.88 | 0.19 | 3.72 | 0.11 | −4.1 |
| Nitrogen retention per day, gm. | | | | | |
| Period 1 | 17.8 | 1.08 | 19.2 | 1.15 | 7.9 |
| Period 2 | 18.2 | 0.31 | 19.6 | 0.29 | 7.7 |
| Period 3 | 18.3 | 0.65 | 19.9 | 0.55 | 8.7 |
| Period 4 | 16.6 | 0.27 | 17.5 | 0.64 | 5.4 |
| Average | 17.7 | 0.33 | 19.1 | 0.40** | 7.9 |

** $P < .01$ using an analysis of variance.

Caffeine at a level of 1.5 gm/kg of feed (about 3 grams per day) resulted in a 7.9% increase ($P < .01$) in nitrogen retention and 8.4% (not believed significant) in body weight gain in 65 kg. pigs. The increase in nitrogen retention was apparent in all periods indicating that the drug was effective for at least 4 weeks in increasing the protein to fat ratio of the pigs. The administration of caffeine appeared to have no appreciable effect on the digestibility of dry matter and protein or on the excretion of urine.

EXAMPLE 2

Ten litter-mate pairs of weanling pigs (five of barrows and five of gilts) averaging 26 kg. in body weight were used to measure the effect of caffeine on growth rate and carcass composition. They were placed in individual pens and pair-fed a 16% protein diet with one pig in each pair receiving 1.5 gm. of caffeine per kg. of feed. Feed was offered twice daily up to a limit of 2.75 kg. per pig per day with care taken to ensure that no pig consumed more than its pair-mate and that all feed offered was consumed within 30 minutes. The feed was given in the form of a gruel and an automatic waterer was also provided in each pen. Each pair of pigs was slaughtered when the weight of one pig exceeded 87 kg. at the weekly weighing. Measurements were made on carcass weight, length, area of loin eye and depth of back fat. In a known procedure, half of each carcass was frozen, minced and analyzed for dry matter, protein, ash and fat. The results are shown in the following table 2.

TABLE 2

Averages and Standard Errors of Weight Gain, Feed Efficiency, and Carcass Composition of Pair-Fed Pigs Given 1.5 GM. of Caffeine/kg. Feed

| Item | Control | Caffeine | S.E. |
|---|---|---|---|
| No. of pigs | 10 | 10 | |
| Initial weight kg. | 26.4 | 26.5 | 0.42 |
| Days on test | 95.9 | 95.9 | 0.00 |
| Daily gain, gm. | 625 | 627 | 8.2 |
| Carcass weight, kg. | 66.0 | 66.1 | 0.96 |
| Dressing per cent | 76.6 | 76.4 | 0.51 |
| Weight gain per kg. feed, gm. | 308 | 309 | 3.4 |
| Depth of back fat | | | |
| Shoulder, cm. | 3.76 | 3.61 | 0.15 |
| Mid back, cm. | 1.75 | 1.55 | 0.11* |
| Loin, cm. | 2.64 | 2.46 | 0.09* |
| Av. back fat, cm. | 2.72 | 2.54 | 0.09 |
| Minimum over loin eye tracing, cm. | 1.56 | 1.39 | 0.13 |
| Area of loin eye, cm.$^2$ | 31.6 | 31.7 | 1.23 |
| Carcass length, cm. | 76.5 | 77.2 | 0.68 |
| Carcass analysis | | | |
| Dry matter, % | 49.81 | 47.57 | 0.99* |
| Protein, % | 16.93 | 16.89 | 0.28 |
| Ash, % | 3.26 | 3.21 | 0.15 |
| Fat, % | 29.90 | 27.92 | 1.05 |
| Fat (by difference)[a], % | 29.62 | 27.47 | 1.00 |

[a] The mean and standard error of the difference between carcass fat on analysis and by difference was 0.61 + 0.11 percentage units for 20 pigs in experiment 1 and 0.46 + 0.10 for 24 pigs in experiment 2.
* P <.05

The growth rate of weanling pigs fed caffeine at a level of 1.5 gm./kg. of feed was equal to that of pair-fed controls but the growth rate of all pigs was not as high as expected (table 2 above). The caffeine appeared to reduce the appetite of the pigs since the feed consumption of each pair was in most cases regulated by the pig receiving the drug. After 4 weeks a slight rash appeared on the backs of several of the pigs receiving caffeine but it was not sufficiently severe or general to be sure that it was caused by the drug. Feed efficiency and dressing percentage were unaffected by caffeine but the average depth of back fat was 6.6% lower (significant at $p < .05$ at mid back and loin), the minimum depth of fat over the loin eye tracing was 10.9% lower and the carcass length was slightly greater in the treating group (none of these latter differences were significant).

EXAMPLE 3

In order to determine the degree to which caffeine at a level of 1.5 gm./kg. of feed would restrict feed consumption and the growth rate of pigs when used under self-feeding conditions, 12 pairs of pigs were placed in individual pens with all the pigs being given all the feed they wanted and with one pig of each pair being given feed containing the caffeine. The results are shown in table 3 below.

TABLE 3

Averages and Standard Errors of Weight Gain, Feed Efficiency and Carcass Measurements of Pigs Self-Fed 1.5 GM. of Caffeine/Kg. Feed.

| Item | Control | Caffeine | S.E. |
|---|---|---|---|
| No. of Pigs. | 12 | 12 | |
| Initial weight, kg. | 17.7 | 19.1 | |
| Days on test | 102.1 | 113.2 | 3.49** |
| Daily gain, gm. | 710 | 630 | 19.4** |
| Carcass weight, kg. | 66.7 | 65.7 | 0.80 |
| Dressing per cent | 75.9 | 75.3 | 0.63 |
| Weight gain per kg. feed, gm. | 313 | 318 | 7.3 |
| Depth of back fat | | | |
| Shoulder, cm. | 4.02 | 3.66 | 0.15* |
| Mid back, cm. | 1.86 | 1.50 | 0.06** |
| Loin, cm. | 2.98 | 2.56 | 0.12** |
| Av. back fat, cm. | 2.96 | 2.57 | 0.09** |
| Carcass length, cm. | 79.5 | 79.5 | 0.47 |

* P <.05
** P <.01

It may be observed that the caffeine significantly (P<.01) increased the time required for pigs to reach market weight (by 11 days) and, in doing so, resulted in highly significant reductions in the depth of back fat with a maximum reduction of 19.3% less fat in the loin region. Even though the pigs given caffeine grew more slowly and took longer to reach market weight, their feed efficiency was still slightly higher (1.6% higher but not significant) than that of controls. This provides firm evidence that caffeine may be used to control the voluntary feed consumption of pigs, and in so doing will make them leaner with no decrease in feed efficiency.

EXAMPLE 4

Three Yorkshire barrows each weighing about 50 kg were placed in metal metabolism cages and fed 800 g of a 16% protein basal diet (Table 4 below) and 3000 g of water twice daily at 12 hr intervals. The body fat of the pigs was labelled by the oral administration of 1 mc of palmitic-$C^{14}$ acid in a gelatin capsule, at an 8 a.m. feeding. Two weeks were allowed for the tracer to become distributed throughout the body fat of the pigs, as taught in "Effect of Caffeine on Nitrogen Retention, Carcass Composition, Fat Mobilization and Oxidation of $C^{14}$-labeled Body Fat in Pigs," H. M. Cunningham, J. Animal Science, Vol. 27, 1968, pp. 424–430. They were placed in a respiration chamber, as detailed in "Note on a Simple Respiration Chamber for Carbon-14 Studies of Pigs," H. M. Cunningham, Canadian J. Animal Science, Vol. 47, 1967, pp. 139–141, during Period 1 and the expired $CO_2$ was monitored continuously for 24 hrs., as described in "Equipment for the Continuous Sampling of Expired $C^{14}$ Carbon Dioxide from Animals in a Respiration Chamber," H. M. Cunningham, Canadian J. Animal Science, Vol. 50, 1970, pp. 753–754. Three days later each pig was given 3.0 g of theophylline in its morning feed and again placed in the respiration chamber for 24 hrs. No feed was given during the periods the pigs were held in the respiration chamber. Two weeks after the experimental routine began the whole procedure was repeated during Period 2. The $CO_2$ and $^{14}CO_2$ contents of the liquid $CO_2$ absorbent were determined by techniques described in the previous references.

TABLE 4

Composition of the Control Diet Used

| Ingredient | Per Cent |
|---|---|
| Ground barley | 88.22 |
| Soybean meal (50% protein) | 4.50 |
| Fishmeal (65% protein) | 5.50 |
| Iodized salt | 0.50 |
| Antibiotic* | 0.05 |
| Dicalcium phosphate | 0.25 |
| Ground limestone | 0.80 |
| Vitamin A (5000 I.U./g) | 0.05 |
| Vitamin D (1655 I.U./g) | 0.03 |
| Vitamin $B_{12}$⁺ | 0.05 |
| Zinc sulfate | 0.05 |

* Contained 22 g of oxytetracycline per kg.
⁺ Contained 19.8 mg of vitamin $B_{12}$ per kg.

During the experimental periods, when the control diet without theophylline was fed, the $^{14}CO_2$ expired per hr. by the pigs declined during the first few hours after feeding and then increased to a very high level after 24 hrs. of fasting. When fed theophylline, the expired $^{14}CO_2$ rose to very high levels within 6 hrs. of feeding and remained at relatively high levels, with considerable fluctuation, for the remainder of the 24 hr. period. The stable $CO_2$ expired when feeding the control diet was highest 2 hrs. after feeding and then declined gradually during the next 22 hrs. With theophylline added to the control diet, the $CO_2$ expired rose to about double that of control levels between 4 and 8 hrs. after feeding and then returned to control levels before the end of the 24 hr. period. During the first 12 hrs. of both periods, the $^{14}CO_2$ and stable $CO_2$ respectively, averaged 59 and 68% higher with theophylline than without it, whereas in the 12 to 24 hr. interval, the labelled and stable $CO_2$ were respectively, 28.7 and 22.0% higher with theophylline.

EXAMPLE 5

Twelve pairs of littermate weanling barrows averaging 24 kg in body weight were used to measure the effect of theophylline on growth and carcass quality. They were placed in individual pens and fed a 16% protein diet (Table 4) with one pig in each pair receiving theophylline at a rate of 1.0 g per kg of diet. The pigs were fed ad libitum and marketed when the body weight at the weekly weighing exceeded 87 kg. Measurements were made on carcass weight, length, depth of back fat, area of loin eye (*longissimus dorsi*) and areas of lean and fat in the ham face. The results of this experiment were analyzed statistically by a *t* test for paired data, as detailed in "Methods of Statistical Analysis," C. H. Goulden, 1939, Wiley and Sons, Inc., New York, N.Y.

Theophylline, at a level of 1.0 g per kg of feed was well tolerated by the pigs and had no apparent adverse effects other than a decrease in rate of gain resulting in an extension of 7.5 days required to reach market weight. There was no effect on feed efficiency or dressing percentage. This indicated that theophylline had little effect on feed efficiency with regard to final carcass weight. Detailed results are set forth in Table 5 below.

TABLE 5

Average weight gain, feed efficiency and carcass measurements of ad libitum fed pigs

| Item | Controls | Theophylline**** | S.E. |
|---|---|---|---|
| Number of pigs | 12 | 12 | |
| Initial weight, kg | 24.0 | 24.0 | |
| Days on test | 85.9 | 93.4 | 4.1 |
| Daily gain, g | 757 | 699 | 29* |
| Carcass weight, kg | 70.9 | 70.6 | 0.78 |
| Dressing per cent | 79.8 | 80.2 | 0.46 |
| Weight gain per kg feed, g | 298 | 295 | 12 |
| Area of loin eye, cm² | 28.2 | 31.9 | 0.95** |
| Carcass length, cm | 78.8 | 80.3 | 0.89 |
| Depth of back fat | | | |
|   Shoulder (maximum) cm | 4.65 | 4.11 | 0.23* |
|   Mid back (minimum) cm | 2.51 | 2.16 | 0.14* |
|   Loin (maximum) cm | 3.48 | 3.11 | 0.18 |
|   Average back fat cm | 3.56 | 3.12 | 0.16* |
| Depth over loin eye tracing, cm | 1.98 | 1.35 | 0.17** |
| Predicted yield, trimmed cuts***** | 77.9 | 80.3 | 0.92* |
| Carcass index***** | 100.5 | 103.6 | 1.15* |

* $P<0.05$
** $P<0.01$
*** Fredeen, et al., 1964.
**** 1.0 g theophylline/kg feed
***** Canada Department Agriculture, 1968

The data in Table 5 show that the carcasses of the pigs fed theophylline were considerably leaner than those of controls. The most marked differences were a 13% increase ($P < 0.01$) in area of loin eye, a 12% decrease ($P < 0.05$) in the average depth of back fat and a 32% decrease ($P < 0.01$) in the depth of back fat over the loin eye. Significant improvements ($P < 0.05$) were also recorded in carcass length, predicted yield of trimmed cuts and carcass index.

I claim:

1. A method of increasing at least one of the feed efficiency and the protein to fat ratio of pigs; or of regulating the growth rate of pigs, comprising; administering orally to a pig a compound selected from the group consisting of methyl xanthines and ingestable salts of methyl xanthines, said compound being administered in an effective amount equivalent to between about 0.25 to 2.5 grams of 1, 3, 7-trimethyl xanthine per kg of feed.

2. A method in accordance with claim 1 wherein the compound is administered in an effective amount equivalent to between about 0.5 and 1.5 grams of 1, 3, 7-trimethyl xanthine per kg of feed.

3. A method in accordance with claim 1 wherein the compound is a compound selected from the group consisting of 1, 3-dimethyl xanthine and ingestable salts of 1, 3-dimethyl xanthine.

4. A method in accordance with claim 1 wherein the compound is 1, 3-dimethyl xanthine.

5. The method of claim 1 wherein said compound is selected from the group consisting of 1,3,7-trimethyl xanthine; 1,3-dimethyl xanthine; 3,7-dimethyl xanthine, and ingestible salts thereof.

6. A feed composition comprising a compound selected from the group consisting of methyl xanthines and ingestable salts of methyl xanthines admixed with pig feed, said compound being present in an effective amount equivalent to between about 0.25 and 2.5 grams of 1, 3, 7-trimethyl xanthine per kg of feed.

7. A composition in accordance with claim 6 wherein the compound is present in an effective amount equivalent to between about 0.5 and 1.5 grams of 1, 3, 7-trimethyl xanthine per kg of feed.

8. A composition in accordance with claim 6 wherein the compound is a compound selected from the group consisting of 1, 3-dimethyl xanthine and ingestable salts of 1, 3-dimethyl xanthine.

9. A composition in accordance with claim 6 wherein the compound is 1, 3-dimethyl xanthine.

10. The composition of claim 6 wherein said compound is selected from the group consisting of 1,3,7-trimethyl xanthine; 1,3-dimethyl xanthine; 3,7-dimethyl xanthine, and ingestible salts thereof.

11. A method of feeding pigs to increase the feed efficiency, to increase the protein to fat ratio, or to regulate the growth rate comprising administering orally to a pig a compound selected from the group consisting of caffeine and ingestable salts of caffeine, said compound being administered in an effective amount equivalent to between about 0.25 and 2.5 grams of caffeine per kg of feed.

12. The method of claim 11 wherein said ingestable salt is caffeine acetate, caffeine benzoate, caffeine citrate, caffeine salicylate, or caffeine sodium benzoate.

13. The method of claim 11 wherein 0.5 to 1.5 grams of said compound, expressed as caffeine per kg of feed, is used.

14. The method of claim 11 wherein said compound is caffeine.

15. The method of claim 13 wherein said compound is caffeine.

16. A pig feed composition comprising a compound selected from the group consisting of caffeine and ingestable salts of caffeine admixed with pig feed, said compound being present in an effective amount equivalent to between about 0.25 and 2.5 grams of caffeine per kg of feed.

17. The composition of claim 16 wherein said ingestable salt is selected from the group consisting of caffeine acetate, caffeine benzoate, caffeine citrate, caffeine salicylate, and caffeine sodium benzoate.

18. The composition of claim 16 wherein said compound is present in an effective amount equivalent to 0.5 to 1.5 grams per kg of feed.

19. The composition of claim 18 wherein said compound is caffeine.

20. The composition of claim 16 wherein said compound is caffeine.

* * * * *

UNITED STATES PATENT OFFICE
CERTIFICATE OF CORRECTION

PATENT NO. : 3,852,451
DATED : December 3, 1974
INVENTOR(S) : Hugh M. Cunningham It is certified that error appears in the above-identified patent and that said Letters Patent are hereby corrected as shown below:

On the first page, left-hand column, after

"Inventor: Hugh M. Cunningham, 1054 Castle Hill Cres., Ottawa, Canada"

insert the following:

--- Assignee: Canadian Patents and Development Limited, Ottawa, Canada ---

Signed and sealed this 20th day of May 1975.

(SEAL)
Attest:

RUTH C. MASON
Attesting Officer

C. MARSHALL DANN
Commissioner of Patents
and Trademarks